(12) United States Patent
Majee et al.

(10) Patent No.: US 9,020,912 B1
(45) Date of Patent: Apr. 28, 2015

(54) METHODS FOR ACCESSING DATA IN A COMPRESSED FILE SYSTEM AND DEVICES THEREOF

(75) Inventors: Sumandra Majee, San Jose, CA (US); David Hansen, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/400,202

(22) Filed: Feb. 20, 2012

(51) Int. Cl.
*G06F 17/30* (2006.01)
*H04L 12/46* (2006.01)
*G06F 12/10* (2006.01)

(52) U.S. Cl.
CPC .......... *H04L 12/4675* (2013.01); *G06F 12/109* (2013.01)

(58) Field of Classification Search
USPC ...................................... 707/693, 736; 380/28
See application file for complete search history.

(56) References Cited

U.S. PATENT DOCUMENTS

| | | | |
|---|---|---|---|
| 4,993,030 A | 2/1991 | Krakauer et al. |
| 5,218,695 A | 6/1993 | Noveck et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

"The AFS File System in Distributed Computing Environment," www.transarc.ibm.com/Library/whitepapers/AFS/afsoverview. html, last accessed on Dec. 20, 2002.

(Continued)

*Primary Examiner* — Debbie Le
(74) *Attorney, Agent, or Firm* — LeClairRyan, a Professional Corporation

(57) ABSTRACT

A method, computer readable medium, and network traffic management apparatus that accesses data in a compressed file system includes obtaining an original write request from a client computing device including at least object data. The object data is compressed into a plurality of compressed blocks. A mapping of each compressed block to a portion of the object data compressed therein is generated, wherein the portion of the object data compressed therein is represented in the mapping by a unique object identifier, a start offset, and a length. The compressed blocks and the mapping are stored in at least one data storage device. At least one data access request for at least a portion of the object data is serviced based on the mapping.

24 Claims, 3 Drawing Sheets

(56) References Cited

U.S. PATENT DOCUMENTS

| | | | |
|---|---|---|---|
| 5,838,970 | A | 11/1998 | Thomas |
| 5,862,325 | A | 1/1999 | Reed et al. |
| 5,884,303 | A | 3/1999 | Brown |
| 5,889,935 | A | 3/1999 | Ofek et al. |
| 5,893,086 | A | 4/1999 | Schmuck et al. |
| 5,897,638 | A | 4/1999 | Lasser et al. |
| 5,901,327 | A | 5/1999 | Ofek |
| 5,905,990 | A | 5/1999 | Inglett |
| 5,917,998 | A | 6/1999 | Cabrera et al. |
| 5,920,873 | A | 7/1999 | Van Huben et al. |
| 5,926,816 | A | 7/1999 | Bauer et al. |
| 5,937,406 | A | 8/1999 | Balabine et al. |
| 5,991,302 | A | 11/1999 | Berl et al. |
| 5,995,491 | A | 11/1999 | Richter et al. |
| 5,999,664 | A | 12/1999 | Mahoney et al. |
| 6,012,083 | A | 1/2000 | Savitzky et al. |
| 6,029,168 | A | 2/2000 | Frey |
| 6,044,367 | A | 3/2000 | Wolff |
| 6,044,444 | A | 3/2000 | Ofek |
| 6,047,129 | A | 4/2000 | Frye |
| 6,072,942 | A | 6/2000 | Stockwell et al. |
| 6,078,929 | A | 6/2000 | Rao |
| 6,085,234 | A | 7/2000 | Pitts et al. |
| 6,088,694 | A | 7/2000 | Burns et al. |
| 6,104,706 | A | 8/2000 | Richter et al. |
| 6,128,627 | A | 10/2000 | Mattis et al. |
| 6,128,717 | A | 10/2000 | Harrison et al. |
| 6,161,145 | A | 12/2000 | Bainbridge et al. |
| 6,161,185 | A | 12/2000 | Guthrie et al. |
| 6,181,336 | B1 | 1/2001 | Chiu et al. |
| 6,202,156 | B1 | 3/2001 | Kalajan |
| 6,223,206 | B1 | 4/2001 | Dan et al. |
| 6,233,648 | B1 | 5/2001 | Tomita |
| 6,237,008 | B1 | 5/2001 | Beal et al. |
| 6,256,031 | B1 | 7/2001 | Meijer et al. |
| 6,282,610 | B1 | 8/2001 | Bergsten |
| 6,289,345 | B1 | 9/2001 | Yasue |
| 6,308,162 | B1 | 10/2001 | Ouimet et al. |
| 6,324,581 | B1 | 11/2001 | Xu et al. |
| 6,329,985 | B1 | 12/2001 | Tamer et al. |
| 6,339,785 | B1 | 1/2002 | Feigenbaum |
| 6,349,343 | B1 | 2/2002 | Foody et al. |
| 6,370,543 | B2 | 4/2002 | Hoffert et al. |
| 6,374,263 | B1 | 4/2002 | Bunger et al. |
| 6,374,336 | B1 | 4/2002 | Peters et al. |
| 6,389,433 | B1 | 5/2002 | Bolosky et al. |
| 6,393,581 | B1 | 5/2002 | Friedman et al. |
| 6,397,246 | B1 | 5/2002 | Wolfe |
| 6,412,004 | B1 | 6/2002 | Chen et al. |
| 6,438,595 | B1 | 8/2002 | Blumenau et al. |
| 6,466,580 | B1 | 10/2002 | Leung |
| 6,469,983 | B2 | 10/2002 | Narayana et al. |
| 6,477,544 | B1 | 11/2002 | Bolosky et al. |
| 6,487,561 | B1 | 11/2002 | Ofek et al. |
| 6,493,804 | B1 | 12/2002 | Soltis et al. |
| 6,516,350 | B1 | 2/2003 | Lumelsky et al. |
| 6,516,351 | B2 | 2/2003 | Borr |
| 6,542,909 | B1 | 4/2003 | Tamer et al. |
| 6,549,916 | B1 | 4/2003 | Sedlar |
| 6,553,352 | B2 | 4/2003 | Delurgio et al. |
| 6,556,997 | B1 | 4/2003 | Levy |
| 6,556,998 | B1 | 4/2003 | Mukherjee et al. |
| 6,560,230 | B1 | 5/2003 | Li et al. |
| 6,601,101 | B1 | 7/2003 | Lee et al. |
| 6,606,663 | B1 | 8/2003 | Liao et al. |
| 6,612,490 | B1 | 9/2003 | Herrendoerfer et al. |
| 6,654,346 | B1 | 11/2003 | Mahalingaiah et al. |
| 6,697,871 | B1 * | 2/2004 | Hansen .................. 709/234 |
| 6,704,755 | B2 | 3/2004 | Midgley et al. |
| 6,721,794 | B2 | 4/2004 | Taylor et al. |
| 6,728,265 | B1 | 4/2004 | Yavatkar et al. |
| 6,738,357 | B1 | 5/2004 | Richter et al. |
| 6,738,790 | B1 | 5/2004 | Klein et al. |
| 6,742,035 | B1 | 5/2004 | Zayas et al. |
| 6,744,776 | B1 | 6/2004 | Kalkunte et al. |
| 6,748,420 | B1 | 6/2004 | Quatrano et al. |
| 6,754,215 | B1 | 6/2004 | Arikawa et al. |
| 6,757,706 | B1 | 6/2004 | Dong et al. |
| 6,775,672 | B2 | 8/2004 | Mahalingam et al. |
| 6,775,673 | B2 | 8/2004 | Mahalingam et al. |
| 6,775,679 | B2 | 8/2004 | Gupta |
| 6,782,450 | B2 | 8/2004 | Arnott et al. |
| 6,801,960 | B1 | 10/2004 | Ericson et al. |
| 6,826,613 | B1 | 11/2004 | Wang et al. |
| 6,839,761 | B2 | 1/2005 | Kadyk et al. |
| 6,847,959 | B1 | 1/2005 | Arrouye et al. |
| 6,847,970 | B2 | 1/2005 | Keller et al. |
| 6,850,997 | B1 | 2/2005 | Rooney et al. |
| 6,868,439 | B2 | 3/2005 | Basu et al. |
| 6,871,245 | B2 | 3/2005 | Bradley |
| 6,880,017 | B1 | 4/2005 | Marce et al. |
| 6,889,249 | B2 | 5/2005 | Miloushev et al. |
| 6,914,881 | B1 | 7/2005 | Mansfield et al. |
| 6,922,688 | B1 | 7/2005 | Frey, Jr. |
| 6,934,706 | B1 | 8/2005 | Mancuso et al. |
| 6,938,039 | B1 | 8/2005 | Bober et al. |
| 6,938,059 | B2 | 8/2005 | Tamer et al. |
| 6,959,373 | B2 | 10/2005 | Testardi |
| 6,961,815 | B2 | 11/2005 | Kistler et al. |
| 6,973,455 | B1 | 12/2005 | Vahalia et al. |
| 6,973,549 | B1 | 12/2005 | Testardi |
| 6,975,592 | B1 | 12/2005 | Seddigh et al. |
| 6,985,936 | B2 | 1/2006 | Agarwalla et al. |
| 6,985,956 | B2 | 1/2006 | Luke et al. |
| 6,986,015 | B2 | 1/2006 | Testardi |
| 6,990,114 | B1 | 1/2006 | Erimli et al. |
| 6,990,547 | B2 | 1/2006 | Ulrich et al. |
| 6,990,667 | B2 | 1/2006 | Ulrich et al. |
| 6,996,841 | B2 | 2/2006 | Kadyk et al. |
| 6,999,912 | B2 | 2/2006 | Loisey et al. |
| 7,003,533 | B2 | 2/2006 | Noguchi et al. |
| 7,006,981 | B2 | 2/2006 | Rose et al. |
| 7,010,553 | B2 | 3/2006 | Chen et al. |
| 7,013,379 | B1 | 3/2006 | Testardi |
| 7,020,644 | B2 | 3/2006 | Jameson |
| 7,020,669 | B2 | 3/2006 | McCann et al. |
| 7,024,427 | B2 | 4/2006 | Bobbitt et al. |
| 7,039,061 | B2 | 5/2006 | Connor et al. |
| 7,051,112 | B2 | 5/2006 | Dawson |
| 7,054,998 | B2 | 5/2006 | Arnott et al. |
| 7,055,010 | B2 | 5/2006 | Lin et al. |
| 7,072,917 | B2 | 7/2006 | Wong et al. |
| 7,075,924 | B2 | 7/2006 | Richter et al. |
| 7,089,286 | B1 | 8/2006 | Malik |
| 7,111,115 | B2 | 9/2006 | Peters et al. |
| 7,113,962 | B1 | 9/2006 | Kee et al. |
| 7,120,728 | B2 | 10/2006 | Krakirian et al. |
| 7,120,746 | B2 | 10/2006 | Campbell et al. |
| 7,127,556 | B2 | 10/2006 | Blumenau et al. |
| 7,133,967 | B2 | 11/2006 | Fujie et al. |
| 7,143,146 | B2 | 11/2006 | Nakatani et al. |
| 7,146,524 | B2 | 12/2006 | Patel et al. |
| 7,152,184 | B2 | 12/2006 | Maeda et al. |
| 7,155,466 | B2 | 12/2006 | Rodriguez et al. |
| 7,165,095 | B2 | 1/2007 | Sim |
| 7,167,821 | B2 | 1/2007 | Hardwick et al. |
| 7,171,469 | B2 | 1/2007 | Ackaouy et al. |
| 7,173,929 | B1 | 2/2007 | Testardi |
| 7,181,523 | B2 | 2/2007 | Sim |
| 7,194,579 | B2 | 3/2007 | Robinson et al. |
| 7,197,615 | B2 | 3/2007 | Arakawa et al. |
| 7,219,260 | B1 | 5/2007 | de Forest et al. |
| 7,234,074 | B2 | 6/2007 | Cohn et al. |
| 7,236,491 | B2 | 6/2007 | Tsao et al. |
| 7,237,076 | B2 | 6/2007 | Nakano et al. |
| 7,243,089 | B2 | 7/2007 | Becker-Szendy et al. |
| 7,243,094 | B2 | 7/2007 | Tabellion et al. |
| 7,263,610 | B2 | 8/2007 | Parker et al. |
| 7,269,168 | B2 | 9/2007 | Roy et al. |
| 7,269,582 | B2 | 9/2007 | Winter et al. |
| 7,272,613 | B2 | 9/2007 | Sim et al. |
| 7,280,536 | B2 | 10/2007 | Testardi |
| 7,284,150 | B2 | 10/2007 | Ma et al. |
| 7,293,097 | B2 | 11/2007 | Borr |

(56) References Cited

U.S. PATENT DOCUMENTS

| | | |
|---|---|---|
| 7,293,099 B1 | 11/2007 | Kalajan |
| 7,293,133 B1 | 11/2007 | Colgrove et al. |
| 7,299,250 B2 | 11/2007 | Douceur et al. |
| 7,308,475 B1 | 12/2007 | Pruitt et al. |
| 7,330,486 B2 | 2/2008 | Ko et al. |
| 7,343,398 B1 | 3/2008 | Lownsbrough |
| 7,346,664 B2 | 3/2008 | Wong et al. |
| 7,373,345 B2 | 5/2008 | Carpentier et al. |
| 7,373,520 B1 | 5/2008 | Borthakur et al. |
| 7,383,288 B2 | 6/2008 | Miloushev et al. |
| 7,383,463 B2 | 6/2008 | Hayden et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,418,439 B2 | 8/2008 | Wong |
| 7,437,358 B2 | 10/2008 | Arrouye et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,656,788 B2 | 2/2010 | Ma et al. |
| 7,680,836 B2 | 3/2010 | Anderson et al. |
| 7,685,126 B2 | 3/2010 | Patel et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kirnos |
| 7,725,763 B2 | 5/2010 | Vertes et al. |
| 7,734,603 B1 | 6/2010 | McManis |
| 7,739,540 B2 | 6/2010 | Akutsu et al. |
| 7,743,031 B1 | 6/2010 | Cameron et al. |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,805,470 B2 | 9/2010 | Armangau et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Mathew et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,900,002 B2 | 3/2011 | Lyon |
| 7,903,554 B1 | 3/2011 | Manur et al. |
| 7,904,466 B1 | 3/2011 | Valencia et al. |
| 7,913,053 B1 | 3/2011 | Newland |
| 7,937,421 B2 | 5/2011 | Mikesell et al. |
| 7,953,085 B2 | 5/2011 | Chang et al. |
| 7,953,701 B2 | 5/2011 | Okitsu et al. |
| 7,958,347 B1 | 6/2011 | Ferguson |
| 7,984,108 B2 | 7/2011 | Landis et al. |
| 8,005,953 B2 | 8/2011 | Miloushev et al. |
| 8,015,157 B2 | 9/2011 | Kamei et al. |
| 8,046,547 B1 | 10/2011 | Chatterjee et al. |
| 8,055,724 B2 | 11/2011 | Amegadzie et al. |
| 8,074,107 B2 | 12/2011 | Sivasubramanian et al. |
| 8,099,758 B2 | 1/2012 | Schaefer et al. |
| 8,103,622 B1 | 1/2012 | Karinta |
| 8,112,392 B1 | 2/2012 | Bunnell et al. |
| 8,117,244 B2 | 2/2012 | Marinov et al. |
| 8,171,124 B2 | 5/2012 | Kondamuru |
| 8,209,403 B2 | 6/2012 | Szabo et al. |
| 8,271,751 B2 | 9/2012 | Hinrichs, Jr. |
| 8,306,948 B2 | 11/2012 | Chou et al. |
| 8,326,798 B1 | 12/2012 | Driscoll et al. |
| 8,351,600 B2 * | 1/2013 | Resch .............................. 380/28 |
| 8,417,746 B1 | 4/2013 | Gillett, Jr. et al. |
| 8,468,542 B2 | 6/2013 | Jacobson et al. |
| 8,498,951 B1 | 7/2013 | Baluja et al. |
| 8,572,007 B1 | 10/2013 | Manadhata et al. |
| 8,576,283 B1 | 11/2013 | Foster et al. |
| 8,595,547 B1 | 11/2013 | Sivasubramanian et al. |
| 8,620,879 B2 | 12/2013 | Cairns |
| 8,676,753 B2 | 3/2014 | Sivasubramanian et al. |
| 8,745,266 B2 | 6/2014 | Agarwal et al. |
| 2001/0007560 A1 | 7/2001 | Masuda et al. |
| 2001/0047293 A1 | 11/2001 | Waller et al. |
| 2002/0012382 A1 | 1/2002 | Schilling |
| 2002/0035537 A1 | 3/2002 | Waller et al. |
| 2002/0059263 A1 | 5/2002 | Shima et al. |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0143909 A1 | 10/2002 | Botz et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0178410 A1 | 11/2002 | Haitsma et al. |
| 2002/0194342 A1 | 12/2002 | Lu et al. |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0065956 A1 | 4/2003 | Belapurkar et al. |
| 2003/0128708 A1 | 7/2003 | Inoue et al. |
| 2003/0140210 A1 | 7/2003 | Testardi |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0028043 A1 | 2/2004 | Maveli et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0093474 A1 | 5/2004 | Lin et al. |
| 2004/0098595 A1 | 5/2004 | Aupperle et al. |
| 2004/0133577 A1 | 7/2004 | Miloushev et al. |
| 2004/0133606 A1 | 7/2004 | Miloushev et al. |
| 2004/0139355 A1 | 7/2004 | Axel et al. |
| 2004/0153479 A1 | 8/2004 | Mikesell et al. |
| 2004/0199547 A1 | 10/2004 | Winter et al. |
| 2004/0213156 A1 | 10/2004 | Smallwood et al. |
| 2004/0236798 A1 | 11/2004 | Srinivasan et al. |
| 2004/0250032 A1 | 12/2004 | Ji et al. |
| 2005/0027862 A1 | 2/2005 | Nguyen et al. |
| 2005/0050107 A1 | 3/2005 | Mane et al. |
| 2005/0071589 A1 | 3/2005 | Tross et al. |
| 2005/0091214 A1 | 4/2005 | Probert et al. |
| 2005/0108575 A1 | 5/2005 | Yung |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0160243 A1 | 7/2005 | Lubbers et al. |
| 2005/0175013 A1 | 8/2005 | Le Pennec et al. |
| 2005/0187866 A1 | 8/2005 | Lee |

(56) References Cited

U.S. PATENT DOCUMENTS

| | | |
|---|---|---|
| 2005/0193245 A1 | 9/2005 | Hayden et al. |
| 2005/0198501 A1 | 9/2005 | Andreev et al. |
| 2005/0213587 A1 | 9/2005 | Cho et al. |
| 2005/0246393 A1 | 11/2005 | Coates et al. |
| 2005/0289111 A1 | 12/2005 | Tribble et al. |
| 2006/0010502 A1 | 1/2006 | Mimatsu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112399 A1 | 5/2006 | Lessly |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0179261 A1 | 8/2006 | Rajan |
| 2006/0184589 A1 | 8/2006 | Lees et al. |
| 2006/0200470 A1 | 9/2006 | Lacapra et al. |
| 2006/0206547 A1* | 9/2006 | Kulkarni et al. ............ 707/205 |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2006/0294164 A1 | 12/2006 | Armangau et al. |
| 2007/0016754 A1 | 1/2007 | Testardi |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0061441 A1 | 3/2007 | Landis et al. |
| 2007/0088702 A1 | 4/2007 | Fridella et al. |
| 2007/0136308 A1 | 6/2007 | Tsirigotis et al. |
| 2007/0139227 A1* | 6/2007 | Speirs et al. ............... 341/50 |
| 2007/0180314 A1 | 8/2007 | Kawashima et al. |
| 2007/0208748 A1 | 9/2007 | Li |
| 2007/0209075 A1 | 9/2007 | Coffman |
| 2007/0239944 A1 | 10/2007 | Rupanagunta et al. |
| 2007/0260830 A1 | 11/2007 | Faibish et al. |
| 2008/0046432 A1 | 2/2008 | Anderson et al. |
| 2008/0070575 A1 | 3/2008 | Claussen et al. |
| 2008/0104347 A1 | 5/2008 | Iwamura et al. |
| 2008/0114718 A1 | 5/2008 | Anderson et al. |
| 2008/0189468 A1 | 8/2008 | Schmidt et al. |
| 2008/0200207 A1 | 8/2008 | Donahue et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0282047 A1 | 11/2008 | Arakawa et al. |
| 2008/0294446 A1* | 11/2008 | Guo et al. ............... 704/501 |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0037500 A1* | 2/2009 | Kirshenbaum ............ 707/206 |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0161542 A1 | 6/2009 | Ho |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0240705 A1 | 9/2009 | Miloushev et al. |
| 2009/0240899 A1 | 9/2009 | Akagawa et al. |
| 2009/0265396 A1 | 10/2009 | Ram et al. |
| 2009/0313503 A1 | 12/2009 | Atluri et al. |
| 2010/0017643 A1 | 1/2010 | Baba et al. |
| 2010/0030777 A1 | 2/2010 | Panwar et al. |
| 2010/0061232 A1 | 3/2010 | Zhou et al. |
| 2010/0082542 A1 | 4/2010 | Feng et al. |
| 2010/0122248 A1 | 5/2010 | Robinson et al. |
| 2010/0199042 A1 | 8/2010 | Bates et al. |
| 2010/0205206 A1 | 8/2010 | Rabines et al. |
| 2010/0211547 A1 | 8/2010 | Kamei et al. |
| 2010/0325257 A1 | 12/2010 | Goel et al. |
| 2010/0325634 A1 | 12/2010 | Ichikawa et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0099146 A1 | 4/2011 | McAlister et al. |
| 2011/0099420 A1 | 4/2011 | McAlister et al. |
| 2011/0107112 A1* | 5/2011 | Resch ............... 713/193 |
| 2011/0119234 A1 | 5/2011 | Schack et al. |
| 2011/0296411 A1 | 12/2011 | Tang et al. |
| 2011/0320882 A1 | 12/2011 | Beaty et al. |
| 2012/0042115 A1 | 2/2012 | Young |
| 2012/0078856 A1 | 3/2012 | Linde |
| 2012/0144229 A1 | 6/2012 | Nadolski |
| 2012/0150699 A1 | 6/2012 | Trapp et al. |
| 2013/0007239 A1 | 1/2013 | Agarwal et al. |
| 2013/0058252 A1 | 3/2013 | Casado et al. |
| 2013/0058255 A1 | 3/2013 | Casado et al. |

FOREIGN PATENT DOCUMENTS

| | | |
|---|---|---|
| CA | 2512312 A1 | 7/2004 |
| EP | 0605088 A3 | 2/1996 |
| EP | 0 738 970 A1 | 10/1996 |
| JP | 63010250 A | 1/1988 |
| JP | 6205006 A | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000-183935 | 6/2000 |
| NZ | 566291 A | 12/2008 |
| WO | 02/39696 A2 | 5/2002 |
| WO | WO 02/056181 A2 | 7/2002 |
| WO | WO 2004/061605 A2 | 7/2004 |
| WO | 2006091040 A1 | 8/2006 |
| WO | WO 2008/130983 A1 | 10/2008 |
| WO | WO 2008/147973 A2 | 12/2008 |

OTHER PUBLICATIONS

Aguilera et al., "Improving recoverability in multi-tier storage systems," International Conference on Dependable Systems and Networks (DSN-2007), Jun. 2007, 10 pages, Edinburgh, Scotland.

Anderson et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, 40 pages, Association for Computing Machinery, Inc.

Anonymous, "How DFS Works: Remote File Systems," Distributed File System (DFS) Mar. 2003, 54 pages, Technical Reference retrieved from the Internet on Feb. 13, 2009, URL<http://technetmicrosoft.com/en-us/library/cc782417(WS.10,printer).aspx>.

(56) References Cited

OTHER PUBLICATIONS

Apple, Inc., "Mac OS X Tiger Keynote Intro. Part 2," Jun. 2004, www.youtube.com <http://www.youtube.com/watch?v=zSBJwEmRJbY>, 1 page.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spo tlight.html>, pp. 1-6.

"A Storage Architecture Guide," Second Edition, 2001, Auspex Systems, Inc., www.auspex.com, last accessed on Dec. 30, 2002.

Basney et al., "Credential Wallets: A Classification of Credential Repositories Highlighting MyProxy," Sep. 19-21, 2003, pp. 1-20, 31$^{st}$ Research Conference on Communication, Information and Internet Policy (TPRC 2003), Arlington, Virginia.

Botzum, Keys, "Single Sign on—A Contrarian View," Aug. 6, 2001, pp. 1-8, Open Group Website, http://www.opengroup.org/security/topics.htm.

Cabrera et al., "Swift: A Storage Architecture for Large Objects," In Proceedings of the-Eleventh IEEE Symposium on Mass Storage Systems, Oct. 1991, pp. 123-128.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, 22 pages, Technical report number UCSC-CRL-92-09 of the Computer & Information Sciences Department of University of California at Santa Cruz.

Callaghan et al., "NFS Version 3 Protocol Specifications" (RFC 1813), Jun. 1995, 127 pages, The Internet Engineering Task Force (IETN), www.ietf.org, last accessed on Dec. 30, 2002.

Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.

Cavale, M. R., "Introducing Microsoft Cluster Service (MSCS) in the Windows Server 2003", Nov. 2002, 10 pages, Microsoft Corporation.

"CSA Persistent File System Technology," A White Paper, Jan. 1, 1999, pp. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, pp. 254-265, vol. 28, Web Cache Sharing for Computing No. 4.

Farley, M., "Enterprise Storage Forum," Jan. 2000, 2 pages, Book Review-Building Storage Networks, 2$^{nd}$ Edition, http://www.enterprisestorageforum.com/sans/features/print/0,,10556_1441201.00. html, Enterprise Storage Forum Staff, last accessed Dec. 20, 2002.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.

Gibson et al., "NASD Scalable Storage Systems," Jun. 1999, 6 pages, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

International Search Report for International Patent Application No. PCT/US2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT /US02/00720, Jul. 8, 2004.

International Search Report from International Application No. PCT/US03/41202, mailed Sep. 15, 2005.

Karamanolis, C. et al., "An Architecture for Scalable and Manageable File Services," HPL-2001-173, Jul. 26, 2001. pp. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13th LISA Conf., 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., Response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993, 105 pages, http://www.ietf.org/ rfc/rfc1510.txt?number=1510.

Korkuzas, V., Communication pursuant to Article 96(2) EPC dated Sep. 11, 2007 in corresponding European patent application No. 02718824.2-2201, 3 pages.

Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci1527986,00.html>.

Long et al., "Swift/RAID: A distributed RAID System", Computing Systems, Summer 1994, 20 pages, vol. 7.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, 125 pages, Storage Networking Industry Association (SNIA), www.snia.org, last accessed on Mar. 26, 2001.

Novotny et al., "An Online Credential Repository for the Grid: MyProxy," 2001, pp. 1-8.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29,-Dec. 3, 2004, 5 pages, Royal Holloway, University of London.

Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc., www.acm.org, last accessed on Dec. 20, 2002.

Pearson, P.K., "Fast Hashing of Variable-Length Text Strings," Comm. of the ACM, Jun. 1990, pp. 677-680, vol. 33, No. 6.

(56) References Cited

OTHER PUBLICATIONS

Peterson, M., "Introducing Storage Area Networks," Feb. 1998, 6 pages, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org/publications/library/proceedings/als2000/full_papers/preslan/presl, last accessed on Dec. 20, 2002.
Response filed Jul. 6, 2007 to Office action dated Feb. 6, 2007 for related U.S. Appl. No. 10/336,784, 24 pages.
Response filed Mar. 20, 2008 to Final Office action dated Sep. 21, 2007 for related U.S. Appl. No. 10/336,784, 22 pages.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph—p. 868, col. 1, paragraph 1.
Rsync, "Welcome to the Rsync Web Pages," Retrieved from the Internet URL: http://samba.anu.edu.ut.rsync/.(Retrieved on Dec. 18, 2009 ), 5 pages.
Savage, et al., "AFRAID—A Frequently Redundant Array of Independent Disks," Jan. 22-26, 1996, pp. 1-13, USENIX Technical Conference, San Diego, California.
"Scaling Next Generation Web Infrastructure with Content-Intelligent Switching: White Paper," Apr. 2000, pp. 1-9, Alteon Web Systems, Inc.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, 24 pages, in Proceedings of the Fifth NASA Goddard Space Flight Center Conference on Mass Storage Systems and Technologies, College Park, Maryland.
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Stakutis, C., "Benefits of SAN-based file system sharing," Jul. 2000, pp. 1-4, InfoStor, www.infostor.com, last accessed on Dec. 30, 2002, Penn Well Corporation.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Tulloch, Mitch, "Microsoft Encyclopedia of Security," 2003, pp. 218, 300-301, Microsoft Press, Redmond, Washington.
Uesugi, H., Nov. 26, 2008 amendment filed by Japanese associate in response to office action dated May 26, 2008 in corresponding Japanese patent application No. 2002-556371, 5 pages.
Uesugi, H., English translation of office action dated May 26, 2008 in corresponding Japanese patent application No. 2002-556371, 2 pages.
Uesugi, H., Jul. 15, 2008 letter from Japanese associate reporting office action dated May 26, 2008 in corresponding Japanese patent application No. 2002-556371, 2 pages.
"Veritas SANPoint Foundation Suite(tm) and SANPoint Foundation Suite(tm) HA:New Veritas volume Management and File System Technology for Cluster Environments," Sep. 2001, 26 pages, Veritas Software Corp.
Wilkes, J., et al., "The HP AutoRAID Hierarchical Storage System," Feb. 1996, 29 pages, vol. 14, No. 1, ACM Transactions on Computer Systems.
"Windows Clustering Technologies—An Overview," Nov. 2001, 31 pages, Microsoft Corp., www.microsoft.com, last accessed on Dec. 30, 2002.
Zayas, E., "AFS-3 Programmer's Reference: Architectural Overview," Sep. 2, 1991, 37 pages, Version 1.0 (doc. number FS-00-D160) Transarc Corporation.
Gupta et al., "Algorithms for Packet Classification", Computer Systems Laboratory, Stanford University, CA, Mar./Apr. 2001, pp. 1-29.
Heinz II G., "Priorities in Stream Transmission Control Protocol (SCTP) Multistreaming", Thesis submitted to the Faculty of the University of Delaware, Spring 2003, pp. 1-35.
Internet Protocol,"DARPA Internet Program Protocol Specification", (RFC:791), Information Sciences Institute, University of Southern California, Sep. 1981, pp. 1-49.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Modiano E., "Scheduling Algorithms for Message Transmission Over a Satellite Broadcast System," MIT Lincoln Laboratory Advanced Network Group, Nov. 1997, pp. 1-7.
Ott D., et al., "A Mechanism for TCP-Friendly Transport-level Protocol Coordination", USENIX Annual Technical Conference, 2002, University of North Carolina at Chapel Hill, pp. 1-12.
Padmanabhan V., et al., "Using Predictive Prefetching to Improve World Wide Web Latency", SIGCOM, 1996, pp. 1-15.
Rosen E., et al., "MPLS Label Stack Encoding", (RFC:3032) Network Working Group, Jan. 2001, pp. 1-22, (http://www.ietf.org/rfc/rfc3032.txt).
Wang B., "Priority and Realtime Data Transfer Over the Best-Effort Internet", Dissertation Abstract, Sep. 2005, ScholarWorks@UMASS.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

METHODS FOR ACCESSING DATA IN A COMPRESSED FILE SYSTEM AND DEVICES THEREOF

FIELD

This technology generally relates to accessing object data in a compressed file system, and, more particularly, to efficient methods and devices for servicing read and write data access requests independent of protocol.

BACKGROUND

In order to optimize utilization of relatively fast storage devices having limited capacity, such as in a tiered file storage system, relatively infrequently accessed files are often compressed into blocks of data and archived in relatively slow storage devices of the tiered storage system. Accessing an archived file, such as in response to a read or write request, generally requires decompressing the entire file, as identified based on a file handle or other identifier included in the request, in order to locate a portion of the file identified by a start offset and/or a length included in the request.

Accordingly, although such read and write requests often identify only a portion of the original file, all of the compressed blocks associated with the original file must be retrieved and decompressed in order to locate the requested portion, in order to service a read request, or locate the portion to be written, in order to service a write request. Additionally, in order to service a write request, the entire original file generally must be recompressed, subsequent to the write procedure, even though only a portion of the original file may have been modified. Retrieving and decompressing all of the compressed blocks associated with a file, and in the case of a write request, recompressing an entire file, requires significant time and resources thereby increasing the response time to the requesting client computing device, which is undesirable.

SUMMARY

A method for managing requests for content includes obtaining with a network traffic management apparatus an original write request from a client computing device including at least object data. The object data is compressed with the network traffic management apparatus into a plurality of compressed blocks. A mapping of each compressed block to a portion of the object data compressed therein is generated with the network traffic management apparatus, wherein the portion of the object data compressed therein is represented in the mapping by a unique object identifier, a start offset, and a length. The compressed blocks and the mapping are stored with the network traffic management apparatus in at least one data storage device. At least one data access request for at least a portion of the object data is serviced with the network traffic management based on the mapping.

A non-transitory computer readable medium having stored thereon instructions for managing requests for content comprising machine executable code which when executed by at least one processor, causes the processor to perform steps including obtaining an original write request from a client computing device including at least object data. The object data is compressed into a plurality of compressed blocks. A mapping of each compressed block to a portion of the object data compressed therein is generated, wherein the portion of the object data compressed therein is represented in the mapping by a unique object identifier, a start offset, and a length. The compressed blocks and the mapping are stored in at least one data storage device. At least one data access request for at least a portion of the object data is serviced based on the mapping.

A network traffic management apparatus includes a memory, configurable logic, and a processor coupled to the memory and the configurable logic, at least one of the configurable logic configured to implement or the processor configured to execute programmed instructions stored in the memory including obtaining an original write request from a client computing device including at least object data. The object data is compressed into a plurality of compressed blocks. A mapping of each compressed block to a portion of the object data compressed therein is generated, wherein the portion of the object data compressed therein is represented in the mapping by a unique object identifier, a start offset, and a length. The compressed blocks and the mapping are stored in at least one data storage device. At least one data access request for at least a portion of the object data is serviced based on the mapping.

This technology provides a number of advantages including methods, non-transitory computer readable medium, and devices that efficiently access data in a compressed file system, the data being required to service read or write data access requests received from networked client computing devices. With this technology, a mapping of object data to compressed blocks including compressed object data is stored and utilized to retrieve only a portion of the compressed blocks storing the object data required to service a read or write request. Accordingly, only a subset of the compressed blocks storing object data needs to be decompressed to service a read request for only a portion of a file. Additionally, only a subset of the compressed blocks storing object data needs to be decompressed, modified, and rewritten to service a write request that does not require additional storage space beyond the fixed size of the compressed blocks. As a result, resource utilization is improved as well as response time, thereby improving the user experience with the file storage system.

DETAILED DESCRIPTION

Figure 1:
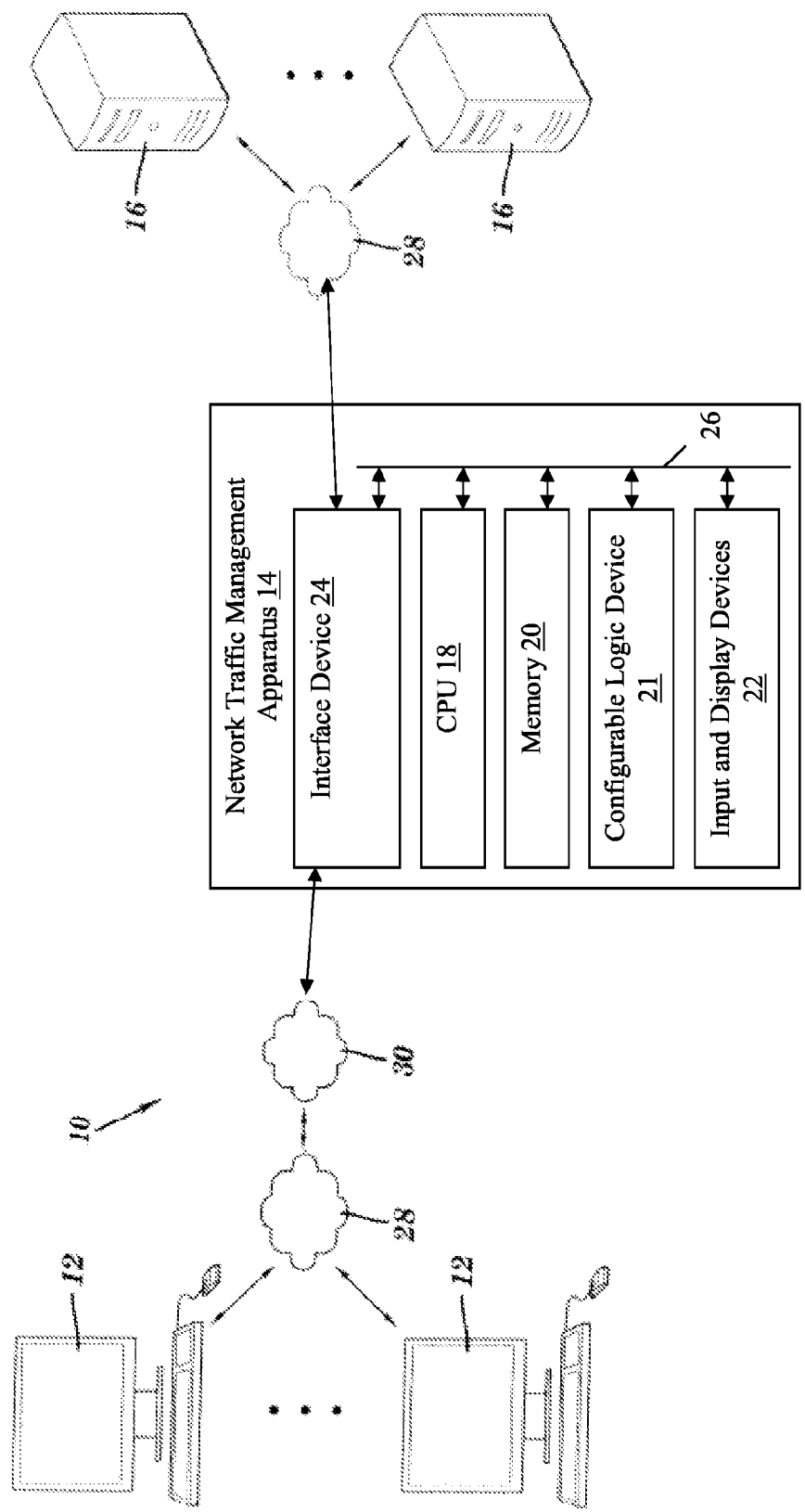
FIG. 1 is a block diagram of a network environment with an exemplary network traffic management apparatus that accesses data in a compressed file system.

A network environment 10 with an exemplary network traffic management apparatus 14 for accessing data in a compressed file system is illustrated in FIG. 1. In this example, the environment 10 includes client computing devices 12, network traffic management apparatus 14, and servers 16, which are coupled together by local area networks (LAN) 28 and wide area network (WAN) 30, although other types and numbers of devices, components, and elements in other topologies could be used. While not shown, the environment 10 also may include additional network components, such as routers, switches and other devices, which are well known to those of ordinary skill in the art and thus will not be described here. This technology provides a number of advantages including methods, non-transitory computer readable medium, and apparatus that efficiently service data access requests in a compressed file storage system.

In this example, the network traffic management apparatus 14 is coupled to client computing devices 12 through one of the LANs 28, although the client computing devices 12, or other devices, and network traffic management apparatus 14 may be coupled together via other topologies. Additionally, the network traffic management apparatus 14 is coupled to the servers 16 through another one of the LANs 28, although the servers 16, or other devices, and the network traffic management apparatus 14 may be coupled together via other topologies. LANs 28 each may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The network traffic management apparatus 14 is further coupled to client computing devices 12 through WAN 30, which may comprise any wide area network (e.g., Internet), although any other type of traffic network topology may be used. Various network processing applications, such as CIFS applications, NFS applications, HTTP Web Server applications, and/or FTP applications, may be operating on servers 16 and transmitting data (e.g., files, Web pages) through the network traffic management apparatus 14 in response to requests for content from client computing devices 12.

The network traffic management apparatus 14 facilitates servicing of data access requests in a compressed file storage system as illustrated and described with the examples herein, although network traffic management apparatus 14 may perform other types and numbers of functions, such as optimizing, securing and accelerating the traffic between client computing devices 12 and servers 16, and/or one or more applications. Network traffic management apparatus 14 includes at least one processor 18, memory 20, optional configurable logic device 21, I/O interface 22, and interface device 24 which are coupled together by bus 26, although network traffic management apparatus 14 may comprise other types and numbers of elements in other configurations. Although network traffic management apparatus 14 is shown in this example as being a standalone device, such as a BIG-IP® device offered by F5 Networks, Inc., of Seattle, Wash., it should be appreciated that the network traffic management apparatus 14 could also be one of several blades servers coupled to a chassis device, such as a VIPRION® device, also offered by F5 Networks, Inc., of Seattle, Wash.

Processor(s) 18 may execute one or more computer-executable instructions stored in the memory 20 for the methods illustrated and described with reference to the examples, although the processor(s) can execute other types and numbers of instructions and perform other types and numbers of operations. The processor(s) 18 may comprise one or more central processing units (CPUs) or general purpose processors with one or more processing cores, such as AMD® processor(s), although other types of processor(s) could be used (e.g., Intel®).

Memory 20 may comprise one or more tangible storage media and/or devices, such as RAM, ROM, flash memory, CD-ROM, floppy disk, hard disk drive(s), solid state memory, DVD, or any other memory storage types or devices, including combinations thereof, which are known to those of ordinary skill in the art. The various storage devices of the memory 20 may be arranged in a tiered storage system to allow for less expensive and larger capacity storage devices, for example, to store less frequently accessed, compressed and/or archived data.

Figure 2:
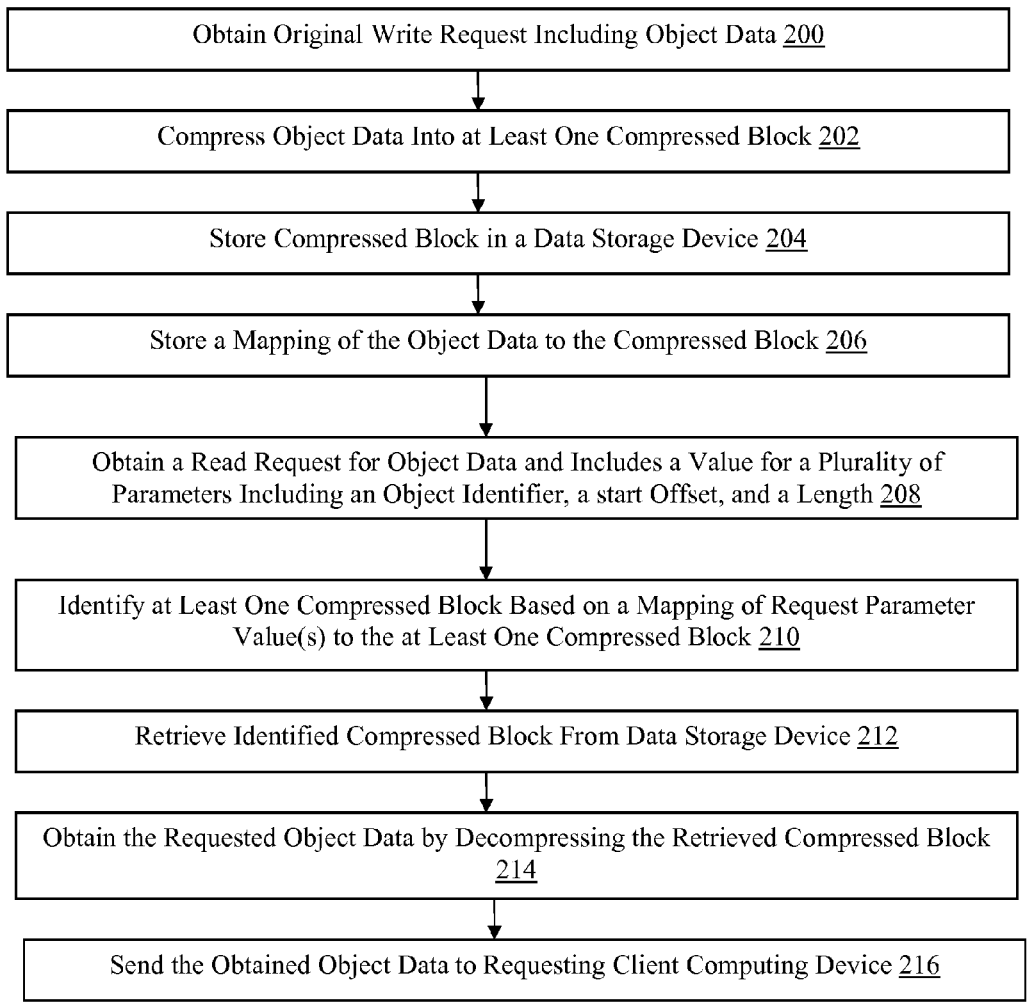
FIG. 2 is a flowchart of an exemplary method for servicing read data access requests in a compressed file system.
Figure 3:
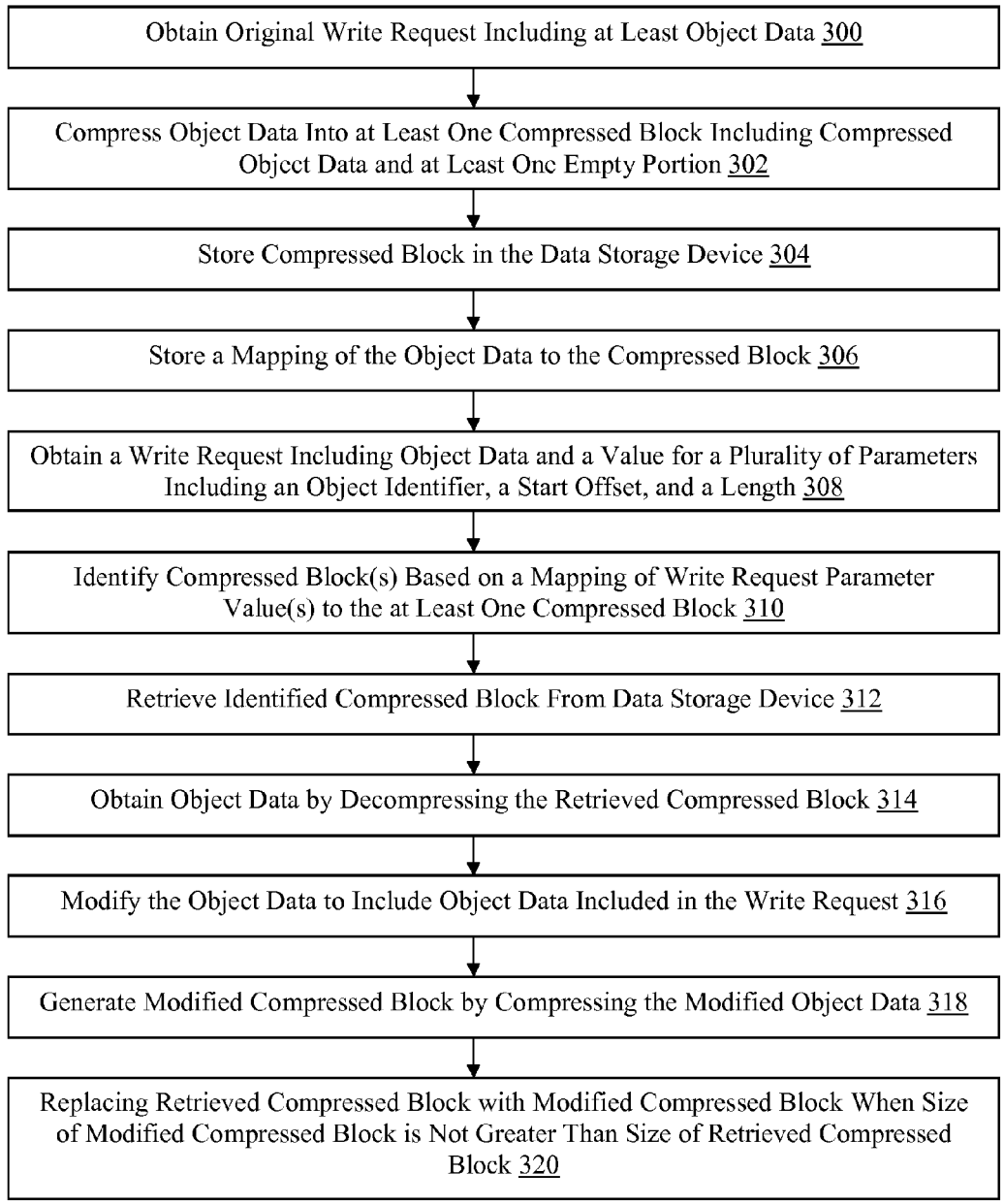
FIG. 3 is a flowchart of an exemplary method for servicing write data access requests in a compressed file system.

Memory 20 may store one or more non-transitory computer-readable instructions of this technology as illustrated and described with reference to the examples herein that may be executed by the one or more processor(s) 18. The flow charts shown in FIGS. 2 and 3 are representative of example steps or actions of this technology that may be embodied or expressed as one or more non-transitory computer or machine readable instructions stored in memory 20 that may be executed by the processor(s) 18 and/or may be implemented by configured logic in optional configurable logic device 21.

The optional configurable logic device 21 may comprise specialized hardware configured to implement one or more steps of this technology as illustrated and described with reference to the examples herein. By way of example only, the optional configurable logic device 21 may comprise one or more of field programmable gate arrays (FPGAs), field programmable logic devices (FPLDs), application specific integrated circuits (ASICs) and/or programmable logic units (PLUs).

Input and display devices 22 enable a user, such as an administrator, to interact with the network traffic management apparatus 14, such as to input and/or view data and/or to configure, program and/or operate it by way of example only. Input devices may include a keyboard and/or a computer mouse and display devices may include a computer monitor, although other types and numbers of input devices and display devices could be used.

The interface device 24 in the network traffic management apparatus 14 is used to operatively couple and communicate between the network traffic management apparatus 14 and the client computing devices 12 and the servers 16, which are all coupled together by one or more local area networks (LAN) 28 and wide area networks (WAN) 30, although other types and numbers of communication networks or systems with other types and numbers of connections and configurations to other devices and elements. By way of example only, the local area networks (LAN) 28 and wide area networks (WAN) 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the client computing devices 12 and the servers 16 include a central processing unit (CPU) or processor, a memory, an interface device, and an I/O system, which are coupled together by a bus or other link, although other numbers and types of network devices could be used. The client computing devices 12, in this example, may run interface applications, such as Web browsers, that may provide an interface to make requests for and send content and/or data to different server-based applications via the LANs 28 and/or WANs 30.

Generally, servers 16 process requests received from client computing devices 12 via LANs 28 and/or WANs 30 according to the HTTP-based application RFC protocol or the CIFS or NFS protocol in this example, but the principles discussed herein are not limited to this example and can include other application protocols. A series of applications may run on the servers 16 that allow the transmission of data, such as object data, files, and/or metadata, requested by the client computing devices 12. The servers 16 may provide data or receive data in response to requests directed toward the respective applications on the servers 16 from the client computing devices 12. In some example, the servers 16 may further include various storage devices including a tiered file storage system and/or may be one or more tiers of a tiered file storage system including one or more other network devices. Accordingly the servers 16 can provide backup, archived, and/or compressed data storage services for other networked devices. It is to be understood that the servers 16 may be hardware or software or may represent a system with multiple servers 16 in a server pool, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

Although an exemplary network environment 10 with client computing devices 12, network traffic management apparatus 14, servers 16, LANs 28 and WANs 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for servicing read data access requests in a compressed file system will now be described with reference to FIGS. 1-2. In this particular example, in step 200, the network traffic management apparatus 14 obtains at least one original write request including at least the object data to be stored, although in other examples the data may already compressed and stored as described here with reference to steps 200, 202, 204, and 206.

In step 202, the network traffic management apparatus 14 compresses the object data into at least one compressed block. In some examples, each compressed block has a fixed size or length, such as 64 kilobytes, for example, although the compressed blocks may be any other fixed size or of variable size.

In step 204, the network traffic management apparatus 14 stores the compressed blocks in the memory 20, although the compressed blocks can be stored in other data storage devices and at other locations. For example, the compressed blocks could be stored in one or more file server devices 16, a tiered storage system including the memory 20 and/or one or more file server devices 16, and/or any other data storage device(s).

In step 206, the network traffic management apparatus 14 maintains and stores a mapping of the original object data to the compressed blocks of object data, which the network traffic management apparatus 14 in the memory 20, although the mapping could be stored in other locations. One exemplary mapping is a table including object identifier, start offset, and length values for the object data included in the original write request associated with a unique identifier of the compressed block storing the compressed object data for the portion of the object data indicated by the associated start offset and length values, although other mappings of the original object data to the compressed object data can be used.

In one example, the unique identifier for each compressed block includes a file handle or other identifier shared by a plurality of compressed blocks storing compressed data for the same object as well as a start offset and a length value that together uniquely identify each compressed block. In the latter example, and in the exemplary operation in which the compressed blocks are of a fixed size, the length values will all be the same and the start offsets will all be intervals determined by the length value. In order to locate the compressed blocks at a later time, the network traffic management apparatus 14 can store a mapping of the unique identifier for each compressed block to a location of the compressed block in the data storage device or utilize any other method of maintaining the location of the compressed blocks.

In step 208, the network traffic management apparatus 14 obtains a read data access request from a client computing device 12 for object data previously stored as described and illustrated earlier with respect to steps 200, 202, 204, and 206. The read request can be based on any protocol requiring at least object identifier or file handle, start offset, and length parameters, the length parameter indicating a number of bytes, for example, including a common Internet file system (CIFS) protocol, a network file system (NFS) protocol, or a file transfer protocol (FTP), for example.

In step 210, the network traffic management apparatus 14 identifies at least one compressed block storing compressed object data required to service the read request by querying the table based on the read request parameter values. Accordingly, in one example, a read request is obtained by the network traffic management apparatus 14 from a client computing device 12 including at least parameter values $F_0$ for the object identifier, 50 for the start offset, and 100 for the length. In this example, the mapping stored in step 206 for object $F_0$ indicates that the compressed block having a unique identifier of $C_0$ is storing start offset 0 and length 100, the compressed block having a unique identifier of $C_1$ is storing start offset 100 and length 100, and the compressed block having a unique identifier of $C_2$ is storing start offset 200 and length 75. Accordingly, in step 210, the network traffic management apparatus 14 identifies compressed blocks $C_0$ and $C_1$ based on the mapping of the object data byte range 50-150, as identified by the read request parameter values of 50 for the start offset and 100 for the length.

In step 212, the network traffic management apparatus 14 retrieves the identified compressed blocks from the data storage device. Accordingly, in this example, the network traffic management apparatus 14 retrieves compressed blocks $C_0$ and $C_1$ from a data storage device, such as one of server devices 16.

In step 214, the network traffic management apparatus 14 obtains the requested object data by decompressing the retrieved compressed blocks. Accordingly, in this example, blocks $C_0$ and $C_1$ are decompressed by the network traffic management apparatus 14 and the object data responsive to the received read request in step 208 is obtained based on the read request parameter values.

In step 216, the obtained object data is sent by the network traffic management apparatus 14 to the requesting one of the client computing devices 12. Because the read request included parameter values of 50 for the start offset and 100 for the length, in this example, only the second 50 bytes of object data included in compressed block $C_0$ and only the first 50 bytes of object data included in compressed block $C_1$ are obtained by the network traffic management apparatus 14, in step 214, and sent by the network traffic management apparatus 14, in step 216, to the requesting one of the client computing devices 12.

Accordingly, in this example, the read request received from the client computing device 12 is serviced by the network traffic management apparatus 14 without retrieving compressed block $C_2$ from the data storage device and without decompressing compressed block $C_2$. The ability of the network traffic management apparatus 14 to retrieve and decompress only those compressed blocks necessary to service a read request from a client computing device 12 is made possible by the mapping, stored in step 206, which allows the network traffic management apparatus 14 to identify only a subset of compressed blocks. As compressed files and objects are often archived in relatively slow data storage devices due to their relatively infrequent access by users of client computing devices 12, retrieving and decompressing only those necessary compressed blocks, instead of all compressed blocks storing object data for the object identified in the read request, can reduce resource utilization and response time, particularly when the number of compressed blocks not required to service the read request is substantial.

Referring to FIGS. 1 and 3, an exemplary method for servicing write data access requests in a compressed file system will now be described. In this particular example, the write request is a request to modify object data previously stored in the compressed file system as described with reference to steps 300, 302, 304, and 306.

In step 300, the network traffic management apparatus 14 obtains an original write request including at least the object data to be stored.

In step 302, the network traffic management apparatus 14 compresses the object data into at least one compressed block. In this example, each of the compressed blocks includes compressed object data and at least one empty portion. In some examples, the compressed blocks each have a fixed size, such as 64 kilobytes, 4 kilobytes of which is empty and does not include compressed object data, although any size of compressed block, compressed object data, and empty storage space can be used.

In step 304, the network traffic management apparatus 14 stores the compressed blocks in a data storage device such as the memory 20 of the network traffic management apparatus 14, one or more file server devices 16, a tiered storage system including the memory 20 and/or one or more file server devices 16, and/or any other data storage device(s).

In step 306, the network traffic management apparatus 14 maintains and stores a mapping of the original object data to the compressed blocks of object data.

In step 308, the network traffic management apparatus 14 obtains a write request from a client computing device 12 including a plurality of parameter values and object data to be used to modify object data previously stored as described and illustrated earlier with respect to steps 300, 302, 304, and 306.

The write request can be based on any protocol requiring at least an object identifier or parameter value identifying the object to be modified, a start offset parameter value indicating the beginning location in the object to be modified, and a length parameter value indicating the portion of the object data to be modified. Accordingly, the protocol can include CIFS, NFS, or FTP, for example.

In step 310, the network traffic management apparatus 14 identifies at least one compressed block storing compressed object data required to service the write request by referencing the mapping, such as by querying a table storing the mapping, based on the write request parameter values. In step 312, the network traffic management apparatus 14 retrieves the identified compressed blocks.

In step 314, the network traffic management apparatus 14 obtains the object data to be modified by decompressing the retrieved compressed blocks. As at least a subset of the parameters are the same for a read request as for a write request, the identification of step 310, retrieval of step 312, and obtaining of step 314 can be performed by the network traffic management apparatus 14 as described and illustrated earlier with respect to steps 210, 212, and 214, respectively.

In step 316, the network traffic management apparatus 14 modifies the object data obtained in step 314 to include at least a portion of the object data included in the write request. In step 318, the network traffic management apparatus 14 generates modified compressed blocks by compressing the modified object data. Accordingly, the modified compressed blocks include compressed write request object data along with compressed object data that was previously stored and not currently modified.

The modified compressed blocks may be smaller, the same size, or larger than the corresponding compressed blocks retrieved, in step 312, by the network traffic management apparatus 14, depending on the size of the write request object data, the size of any previously stored object data that is replaced by the write request object data, and/or the compressibility of the object data as modified, for example. If a modified compressed block is not greater than the corresponding retrieved compressed block, the network traffic management apparatus 14 completes service of the write request by replacing, in step 320, the retrieved compressed block with the modified compressed block.

If the size of any compressed block is greater than the corresponding retrieved compressed block, the network traffic management apparatus 14 can retrieve every compressed block storing object data for the object identified by the write request object identifier parameter value, as identified based on the mapping. The network traffic management apparatus 14 can then decompress all of the retrieved compressed blocks, recompress the object data, and update the mapping. Because such an operation is relatively expensive, particularly with respect to compressed and archived data stored on relatively slow data storage device(s), including the empty portion in each compressed block when compressing the object data, in step 302, can provide for expansion of the compressed data upon servicing the write request, thereby reducing the number of instances in which a modified compressed block is greater in size than a corresponding retrieved compressed block.

Accordingly, in this example, in order to service a write data access request received from a client computing device 12, only those compressed blocks storing compressed object data required to service the write request are retrieved and decompressed by the network traffic management apparatus 14. Additionally, in examples in which a space for expansion is included by the network traffic management apparatus 14 in the form of an empty portion in the compressed blocks, the number of instances in which compressed blocks other than those necessary to service the write request will need to be retrieved, decompressed, recompressed, and stored can be reduced, thereby reducing resource utilization and response time.

The examples described herein have particular advantages for applications in which only portions of an archived object or file are read by a client computing device 12. Additionally, the examples described herein have particular advantages for applications in which only portions of an object or file are written such as databases and document and source control systems, for example, although these examples also provide advantages for other applications.

With this technology a mapping of object data to compressed blocks, each including compressed object data, is maintained and stored by the network traffic management apparatus 14 upon receiving an original write request. Subsequent read and write requests requiring access to the object data can be serviced by the network traffic management apparatus 14 based on the mapping and by only retrieving and decompressing, and in the case of some write requests, modifying and recompressing, only the compressed blocks required to service the requests. By accessing fewer compressed blocks in order to service data access requests, resource utilization is reduced and response time for servicing the data access request is reduced for the user of the requesting one of the client computing devices 12.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for accessing data in a compressed file system, comprising:
obtaining, by a network traffic management apparatus, at least one original write request from a client computing device comprising object data;
compressing, by the network traffic management apparatus, the object data into a plurality of compressed blocks;
generating, by the network traffic management apparatus, a mapping of each of the plurality of compressed blocks to a corresponding portion of the object data, wherein every corresponding portion of the object data is represented in the mapping by a corresponding unique object identifier, a start offset, and a length; and
servicing, by the network traffic management apparatus, at least one subsequent data access request for at least a portion of the object data, the servicing comprising obtaining at least the requested portion of the object data from the mapped one of the plurality of compressed blocks based on the unique object identifier, the start offset and the length.

2. The method as set forth in claim 1 wherein the servicing further comprises:
obtaining, by the network traffic management apparatus, the data access request from the client computing device, wherein the data access request comprises a value for a plurality of parameters comprising the object identifier, the start offset, and the length;
identifying, by the network traffic management apparatus, the mapped at least one compressed block based at least in part on the mapping and one or more of the data access request parameter values;
retrieving, by the network traffic management apparatus, the identified compressed block;
obtaining, by the network traffic management apparatus, at least a portion of the object data identified by the data access request parameter values; and
decompressing, by the network traffic management apparatus, the retrieved compressed block.

3. The method as set forth in claim 2 wherein the data access request is a read request, the method further comprising:
sending, by the network traffic management apparatus, the obtained object data to the requesting client computing device.

4. The method as set forth in claim 2 wherein the data access request is a write request, the write request further comprises object data, and wherein the compressing, with the network traffic management apparatus, the object data into a plurality of compressed blocks further comprises:
compressing, by the network traffic management apparatus, the object data into a plurality of compressed blocks each including compressed object data and an empty portion, the method further comprising replacing, by the network traffic management apparatus, the retrieved compressed block with a modified compressed block comprising, compressed write request object data when a size of the modified compressed block is not greater than a size of the retrieved compressed block.

5. The method as set forth in claim 4 further comprising:
modifying, by the network traffic management apparatus, the object data to include at least a portion of the object data included in the write request;
generating, by the network traffic management apparatus, the modified compressed block; and
compressing, by the network traffic management apparatus, the modified object data.

6. The method as set forth in claim 2 wherein the data access request is based on a protocol comprising a common Internet file system (CIFS) protocol, a network file system (NFS) protocol, or a file transfer protocol (FTP).

7. The method as set forth in claim 1 further comprising:
storing, by the network traffic management apparatus, the compressed blocks and the mapping in at least one data storage device.

8. The method as set forth in claim 7, wherein the at least one data storage device comprises tiered storage, a memory of a network traffic management apparatus, or a file server device.

9. A non-transitory computer readable medium having stored thereon instructions for accessing data in a compressed file system comprising machine executable code which when executed by at least one processor, causes the processor to perform steps comprising:
obtaining at least one original write request from a client computing device comprising object data;
compressing the object data into a plurality of compressed blocks;
generating a mapping of each of the plurality of compressed blocks to a portion of the object data, wherein every corresponding portion of the object data is represented in the mapping by a corresponding unique object identifier, a start offset, and a length; and servicing at least one subsequent data access request for one of the portions of the object data, wherein the servicing comprises obtaining at least the requested portion of the object data from the mapped one of the plurality of compressed blocks based on the unique object identifier, the start offset and the length.

10. The medium as set forth in claim 9 wherein the servicing further comprises:

obtaining the data access request from the client computing device, wherein the data access request comprises a value for a plurality of parameters comprising the object identifier, the start offset, and the length;

identifying the mapped at least one compressed block based at least in part on the mapping and one or more of the data access request parameter values;

retrieving the identified compressed block;

obtaining at least a portion of the object data identified by the data access request parameter values; and decompressing the retrieved compressed block.

11. The medium as set forth in claim 10 wherein the data access request is a read request, the medium further having stored thereon instructions that when executed by the at least one processor cause the processor to perform steps further comprising:

sending the obtained object data to the requesting client computing device.

12. The medium as set forth in claim 10 wherein the data access request is a write request, the write request further comprises object data, and the compressing the object data into a plurality of compressed blocks further comprises:

compressing the object data into a plurality of compressed blocks each comprising compressed object data and an empty portion, the medium further comprising replacing the retrieved compressed block with a modified compressed block comprising compressed write request object data when a size of the modified compressed block is not greater than a size of the retrieved compressed block.

13. The medium as set forth in claim 12 further having stored thereon instructions that when executed by the processor cause the processor to perform steps further comprising:

modifying the object data to include at least a portion of the object data included in the write request; and generating the modified compressed block; and compressing the modified object data.

14. The medium as set forth in claim 10 wherein the data access request is based on a protocol comprising a common Internet file system (CIFS) protocol, a network file system (NFS) protocol, or a file transfer protocol (FTP).

15. The medium as set forth in claim 9 further having stored thereon instructions that when executed by the processor cause the processor to perform steps further comprising:

storing, the compressed blocks and the mapping in at least one data storage device.

16. The medium as set forth in claim 15, wherein the at least one data storage device comprises tiered storage, a memory of a network traffic management apparatus, or a file server device.

17. A network traffic management apparatus comprising:
a memory;
configurable logic; and
a processor coupled to the memory and the configurable logic, at least one of the configurable logic configured to implement or the processor configured to execute programmed instructions stored in the memory comprising:

obtaining at least one original write request from a client computing device comprising object data;

compressing the object data into a plurality of compressed blocks;

generating a mapping of each of the plurality of compressed blocks to a portion of the object data, wherein every corresponding portion of the object data is represented in the mapping by a corresponding unique object identifier, a start offset, and a length; and servicing at least one subsequent data access request for one of the portions of the object data, wherein the servicing comprises at least the requested portion of the object data from the mapped one of the plurality of compressed blocks based on the unique object identifier, the start offset and the length.

18. The apparatus as set forth in claim 17 wherein the servicing further comprises:

obtaining, the data access request from the client computing device, wherein the data access request comprises a value for a plurality of parameters comprising the object identifier, the start offset, and the length;

identifying, the mapped at least one compressed block based at least in part on the mapping and one or more of the data access request parameter values;

retrieving, the identified compressed block;

obtaining, at least a portion of the object data identified by the data access request parameter values: and decompressing the retrieved compressed block.

19. The apparatus as set forth in claim 18 wherein the data access request is a read request and wherein at least one of the configurable logic is configured to implement or the processor is further configured to execute, programmed instructions stored in the memory further comprising:

sending the obtained object data to the requesting client computing device.

20. The apparatus as set forth in claim 18 wherein the data access request is a write request, the write request further includes object data, wherein the compressing the object data into a plurality of compressed blocks further comprises:

compressing the object data into a plurality of compressed blocks each including compressed object data and an empty portion, and wherein at least one of the configurable logic configured to implement or the processor are further configured to execute programmed instructions stored in the memory further comprising:

replacing the retrieved compressed block with a modified compressed block including compressed write request object data when a size of the modified compressed block is not greater than a size of the retrieved compressed block.

21. The apparatus as set forth in claim 20 wherein at least one of the configurable logic is configured to implement or the processor is further configured to execute, programmed instructions stored in the memory further comprising:

modifying the object data to include at least a portion of the object data included in the write request; and generating the modified compressed block; and compressing the modified object data.

22. The apparatus as set forth in claim 18 wherein the data access request is based on a protocol comprising a common Internet file system (CIFS) protocol, a network file system (NFS) protocol, or a file transfer protocol (FTP).

23. The apparatus as set forth in claim 17 wherein the processor is further configured to execute programmed instructions stored in the memory further comprising:

storing, the compressed blocks and the mapping in at least one data storage device.

24. The apparatus as set forth in claim 23, wherein the at least one data storage device comprises tiered storage, a memory of a network traffic management apparatus, or a file server device.

* * * * *